US00RE37231E

(19) United States
(12) Reissued Patent
Severinsson

(10) Patent Number: US RE37,231 E
(45) Date of Reissued Patent: Jun. 19, 2001

(54) DISC BRAKE CALIPER

(75) Inventor: Lars Severinsson, Hishult (SE)

(73) Assignee: Haldex Brake Products AB (SE)

(21) Appl. No.: 09/324,506

(22) PCT Filed: Oct. 24, 1995

(86) PCT No.: PCT/SE95/01258

§ 371 Date: Apr. 24, 1997

§ 102(e) Date: Apr. 24, 1997

(87) PCT Pub. No.: WO96/12900

PCT Pub. Date: May 2, 1996

Related U.S. Patent Documents

Reissue of:
(64) Patent No.: 5,833,035
Issued: Nov. 10, 1998
Appl. No.: 08/817,769
Filed: Apr. 27, 1997

(30) Foreign Application Priority Data

Oct. 24, 1994 (SE) ..... 9403624-1

(51) Int. Cl.[7] ..... F16D 65/16
(52) U.S. Cl. ..... 188/72.7; 188/71.9; 188/72.9
(58) Field of Search ..... 188/71.1–71.9, 188/72.7–72.9, 196 BA, 196 D, 196

(56) References Cited

U.S. PATENT DOCUMENTS

| | | | |
|---|---|---|---|
| 5,379,867 | 1/1995 | Macke et al. | 188/71.9 |
| 5,433,298 | 7/1995 | Antony et al. | 188/72.7 |
| 5,449,052 | 9/1995 | Macke et al. | 188/71.9 |
| 5,515,949 | 5/1996 | Baumgartner et al. | 188/72.9 |
| 5,520,267 | 5/1996 | Giering et al. | 188/72.9 |
| 5,547,048 | 8/1996 | Antony et al. | 188/72.9 |
| 5,582,273 | 12/1996 | Baumgartner et al. | 188/72.6 |
| 5,664,646 | 9/1997 | Bejot et al. | 188/71.9 |
| 5,927,445 | 7/1999 | Bieker et al. | 188/72.9 |

*Primary Examiner*—Chris Schwartz
(74) *Attorney, Agent, or Firm*—St. Onge Steward Johnston & Reens LLC

(57) ABSTRACT

A disc brake caliper comprises a housing (1) to be arranged to straddle a vehicule brake disc, a cover (2) attached to the housing, two thrust sleeves (8), which are connected to a brake pad (5) and which are axially movable in the housing, a cross bar (9) connecting the two thrust sleeves, and a lever (17) for transmitting a brake force from a brake cylinder (4), attached to the caliper, to a cross bar. Bearing tappets (20), parallel with the cross bar, are fixedly connected to the inside of the cover. The lever has a curved wedge (19) with two cylindrical surfaces (19', 19") in engagement with corresponding cylindrical surfaces of the bearing tappets and the cross bar, respectively. An adjuster mechanism (28) is arranged on a splined shaft (29) rotatably journalled in the bearing tappets.

18 Claims, 6 Drawing Sheets

DISC BRAKE CALIPER

Matter enclosed in heavy brackets [ ] appears in the original patent but forms no part of this reissue specification; matter printed in italics indicates the additions made by reissue.

TECHNICAL FIELD

This invention relates to a disc brake caliper, comprising a housing to be arranged astraddle of a vehicle brake disc, a cover attached to the housing, two thrust sleeves, which are connected to a brake pad holder provided with a brake pad for braking engagement with a brake disc and which are axially movable in the housing at a distance from each other, a cross bar connecting the two thrust sleeves, and a lever for transmitting a brake force from a brake cylinder, attached to the caliper, to a cross bar.

A disc brake caliper of this kind is primary intended for a road vehicle but may quite as well be used for a rail vehicle.

TECHNICAL BACKGROUND

Prior designs for disc brake calipers of this kind are for example shown in EP-A-0 569 031 and EP-B-0 291 071. In both these designs the force transmission from the lever to the cross bar is rather complex. This means that these disc brake calipers are comparatively expensive and vulnerable.

THE INVENTION

A less complex, cheaper and more reliable design is according to the invention attained in that bearing tappets, parallel with the cross bar, are fixedly connected to the inside of the cover and in that the lever, besides an arm for actuation by the brake cylinder, comprises a curved wedge, having an inner cylindrical surface in engagement with outer cylindrical surfaces of the bearing tappets and an outer cylindrical surface—with greater radius than the inner cylindrical surface—in engagement with an inner cylindrical surface in the cross bar.

In a way known per se needle bearings are preferably arranged between on one hand the inner cylindrical surface of the curved wedge and the outer cylindrical surfaces of the bearing tappets and on the other hand the outer cylindrical surface of the curved wedge and the inner cylindrical surface in the cross bar.

An adjuster mechanism, necessary in a disc brake caliper of this kind, may be arranged in different places, and typical examples of this can be found in the two earlier mentioned patent publications.

According to the present invention an adjuster mechanism is arranged on a splined shaft rotatably journalled in the bearing tappets. Accordingly, the adjuster mechanism is arranged in a stationary part of the caliper with the advantages associated therewith.

Preferably the adjuster mechanism is hereby arranged between the two bearing tappets.

The adjuster mechanism used in the present disc brake caliper comprises an adjuster housing, an adjustment spring with its outer periphery in engagement with an inner surface of the adjuster housing, a driving ring connected to the adjustment spring by means of a radial extension thereof in a driving ring recess, an adjuster hub connected to the splined shaft by means of inner splines, and a one-way spring connected to the driving ring by means of a radial extension and arranged on coaxial cylindrical surfaces of the driving ring and the adjuster hub.

The adjuster housing is preferably connected to the inner cylindrical surface of the curved wedge by a pin or the like extending from the surface into a housing groove.

Hereby the control distance or A-measure for the adjuster is formed either in that the pin has a smaller diameter than the circumferential dimension of the groove or in that the adjuster spring extension has a smaller circumferential dimension than the driving ring recess.

According to a modified embodiment the adjuster housing is provided with external gears in engagement with a gear wheel rotatably journalled in the cover, the gear wheel in turn being in engagement with an internal gear segment in an arcuate yoke of the lever. By this design it is possible to obtain a higher exchange ratio and thus a faster takeup of excessive slack.

In this adjuster mechanism the control distance or A-measure for the adjuster is formed in that the adjuster spring extension has a smaller circumferential dimension than the driving ring recess.

In both these adjuster designs each end of the splined shaft is connected to an adjustment shaft in internal splines connection with the thrust sleeve by means of bevel gears, the thrust sleeve being rotationally connected to the brake pad holder and in thread connection with the cross bar.

The cover and the cross bar may according to the invention be resiliently connected by means of screws extending through holes in the cross bar and attached to the cover, a compression spring being arranged between the head of each screw and a spring sleeve bearing against the cross bar.

By this design a return force for the cross bar and accordingly for the thrust sleeves is obtained, but the cover and the rest of the mechanism are also held together as a unit even in the absence of the housing, which accordingly may be manufactured separately.

BRIEF DESCRIPTION OF THE DRAWINGS

The invention will be described in further detail below reference being made to the accompanying drawings, in which.

DETAILED DESCRIPTION OF PREFERRED EMBODIMENTS

Figure 1:
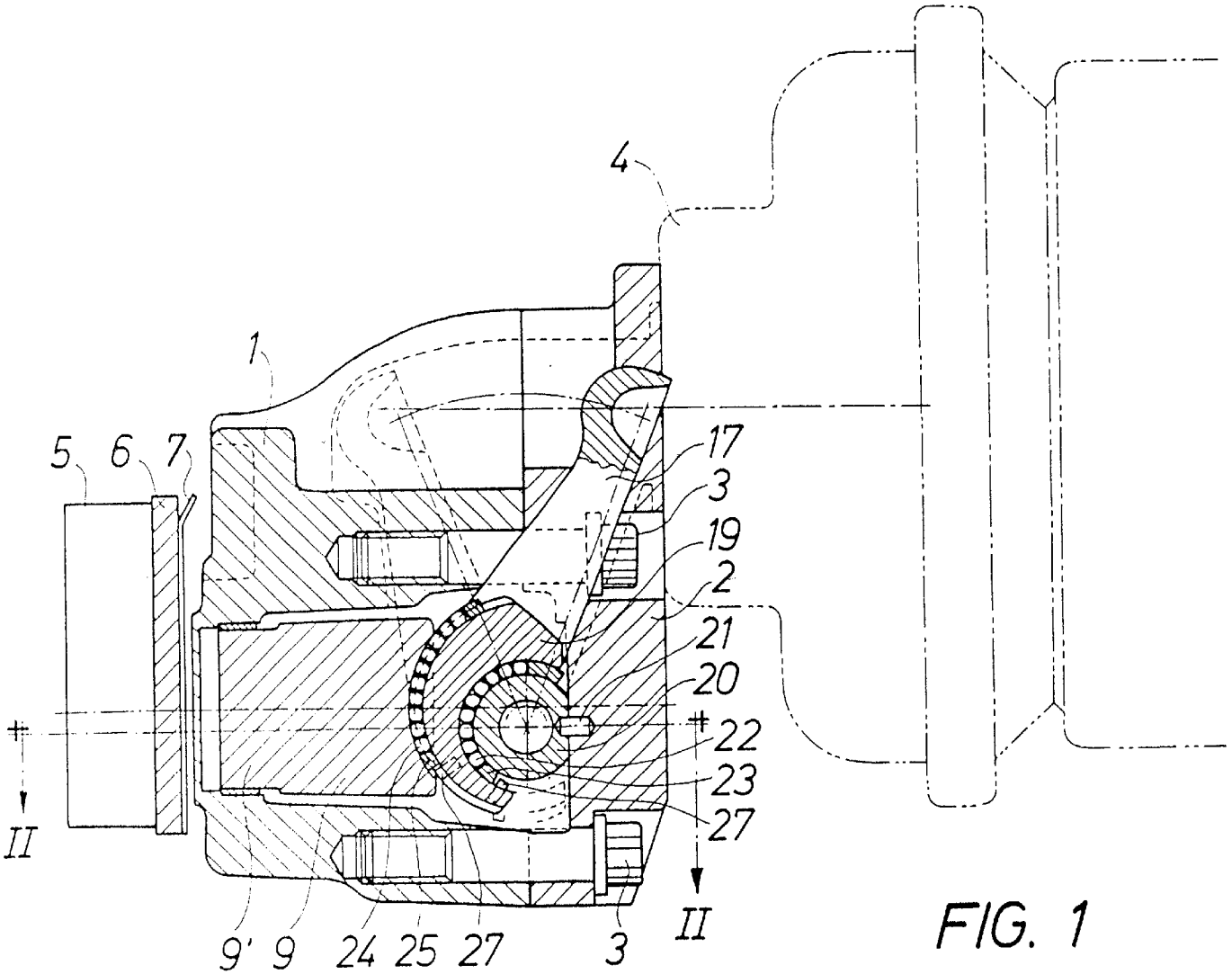
FIG. 1 is a section of a disc brake caliper according to the invention (along the lines I—I in FIG. 2)
Figure 2:
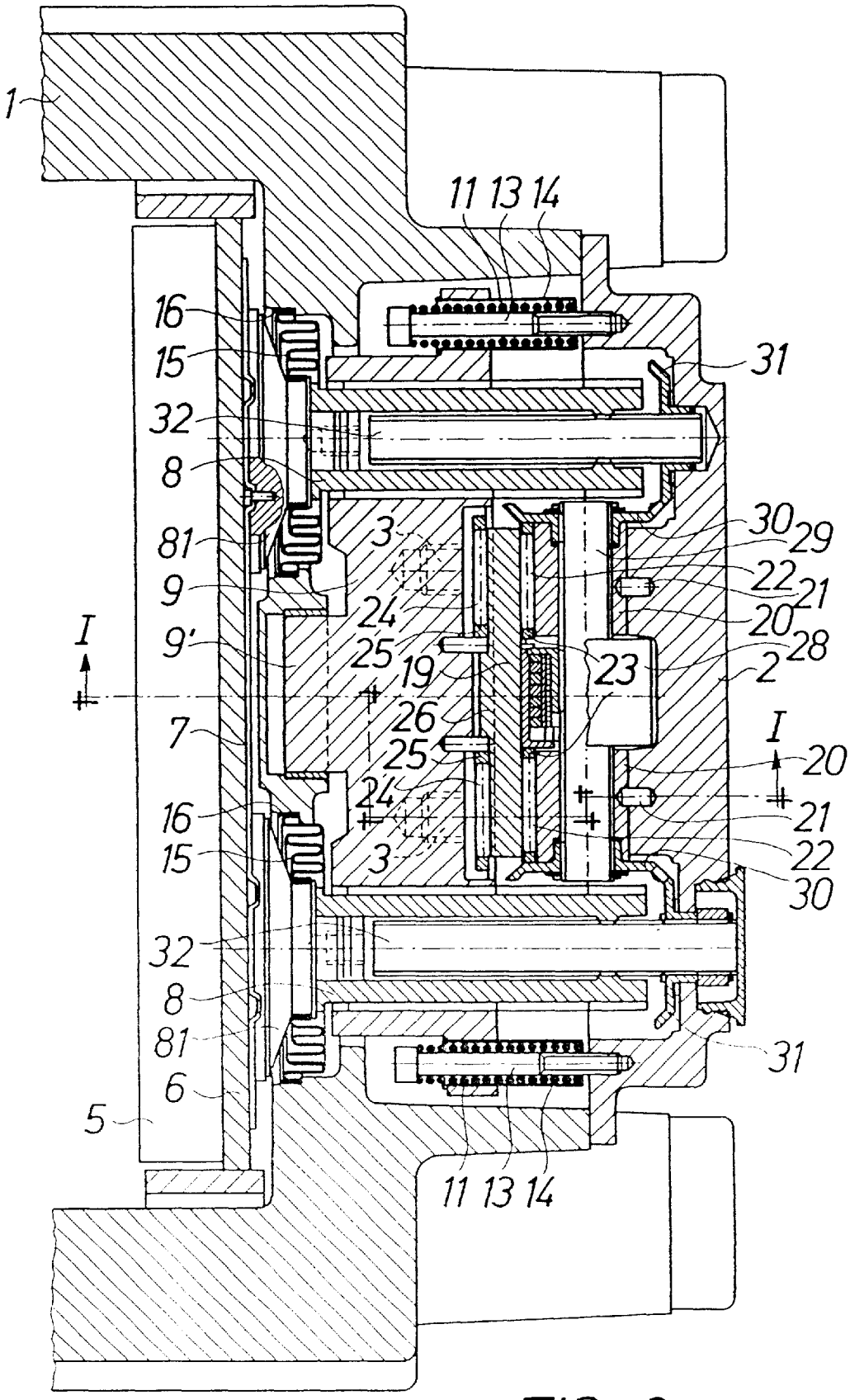
FIG. 2 is a section of the caliper along the line II—II in FIG. 1.
Figure 3:
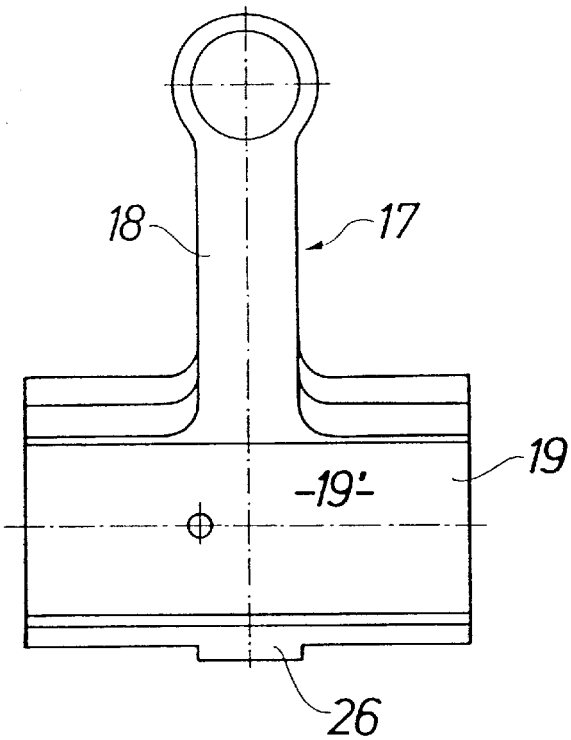
FIG. 3 is a plan view of a lever in the caliper according to the invention.

A disc brake caliper, preferably for use in heavy road vehicles, is shown in FIGS. 1 and 2. As is well known in the art, a caliper of this kind is to be mounted in a vehicle underframe astraddle of a brake disc (not shown) on a rotating axle of the vehicle.

The main components of the disc brake caliper are a housing 1 and a cover 2, which are attached to each other by means of screws 3. Attached to the cover 2 is a brake cylinder 4, normally a pneumatic brake cylinder, for delivering a brake force to the caliper. The brake cylinder 4 is only indicated in FIG. 1 with dash dotted lines.

In a way to be described the brake force from the brake cylinder 4 is transmitted to a brake pad 5 engaging the brake disc (not shown). The reaction force at braking is taken up by a similar brake pad (not shown) attached to the housing 1 at the other side of the brake disc (not shown), as is well known in the art.

The brake pad 5 is attached to a pad holder 6, which in turn—via a heat shield 7—is attached to two thrust plates 81. Rotationally attached to these thrust plates 81 are thrust sleeves 8, which thus are axially and rotationally movable in the housing 1. The two thrust sleeves 8 are provided with external threads, and a cross bar 9, having two internally threaded bores 10 (FIG. 5), is attached to these thrust sleeves 8; the three parts 8 and 9 form a brake force transmitting unit. The cross bar 9 is provided with a projection 9' engaging a corresponding recess in the housing 1 for the guiding of the cross bar 9.

Hold-off or return springs 11 are arranged between the housing 1 or rather the cover 2 and the cross bar 9 in the following way. The cross bar 9 is provided with bores 12 at its two ends. Screws 13 surrounded by the springs 11 pass freely through these holes 12. The screws 13 are attached in corresponding holes in the cover 2. Each spring 11 is arranged between the head of the screw 13 and the bottom end of a spring sleeve 14 which bears against the shoulder on the cross bar 9 with its other end. By the described hold-off spring arrangement delivery of the mechanism as a unit including the hold-off springs is possible, in spite of the fact that the hold-off force acts between the cross bar 9 and the housing 1. The arrangement will act to hold the cover 2 and the rest of the mechanism together also in the absence of the housing 1.

A protective bellows 15 is arranged between each thrust plate 81 and the housing 1 for preventing contaminants to enter into the mechanism inside the housing 1. Each bellows 15 is attached to the thrust plate 81 at the manufacture of the mechanism, whereas the attachment thereof to the housing 1 at the later mounting at the vehicle manufacturer can occur by means of a cup 16 pressed in place by the thrust plate 81.

The brake force from the piston rod (not shown) of the brake cylinder 4 is transmitted to the mechanism, especially the cross bar 9, by means of a lever 17. The lever 17 consists in essence of an arm 18 extending out from what could be called a curved wedge 19 having cylindrical surfaces in engagement with corresponding cylindrical surfaces of the cross bar 9 and bearing tappets 20. Each of these bearing tappets 20 rests by means of a bevel on the cover 2 and is connected thereto by means of a pin 21, so that it can be regarded as a part of the cover 2.

As will appear below there are two bearing tappets 20, and an adjuster mechanism 28 is arranged between them.

Figure 4:
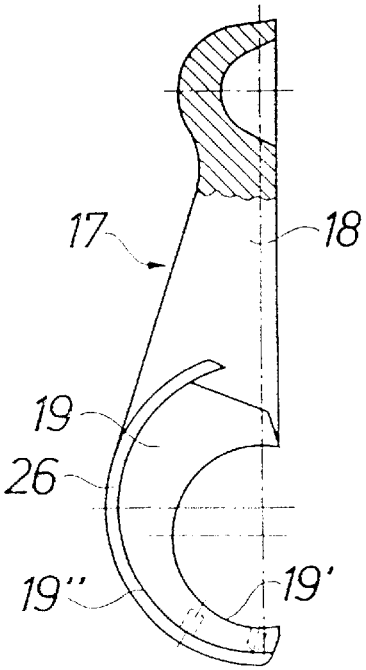
FIG. 4 is a side view of the above lever.

An inner cylindrical surface 19' of the curved wedge 19 cooperates with the bearing tappets 20, whereas an outer cylindrical surface 19" with larger radius than the inner cylindrical surface 19' cooperates with the cross bar 9. The centers for these two cylindrical surfaces 19' and 19" are offset in relation to each other, as appears especially well in FIG. 4, where the center for the outer cylindrical surface 19" is higher than that of the inner cylindrical surface 19'.

Figure 5:
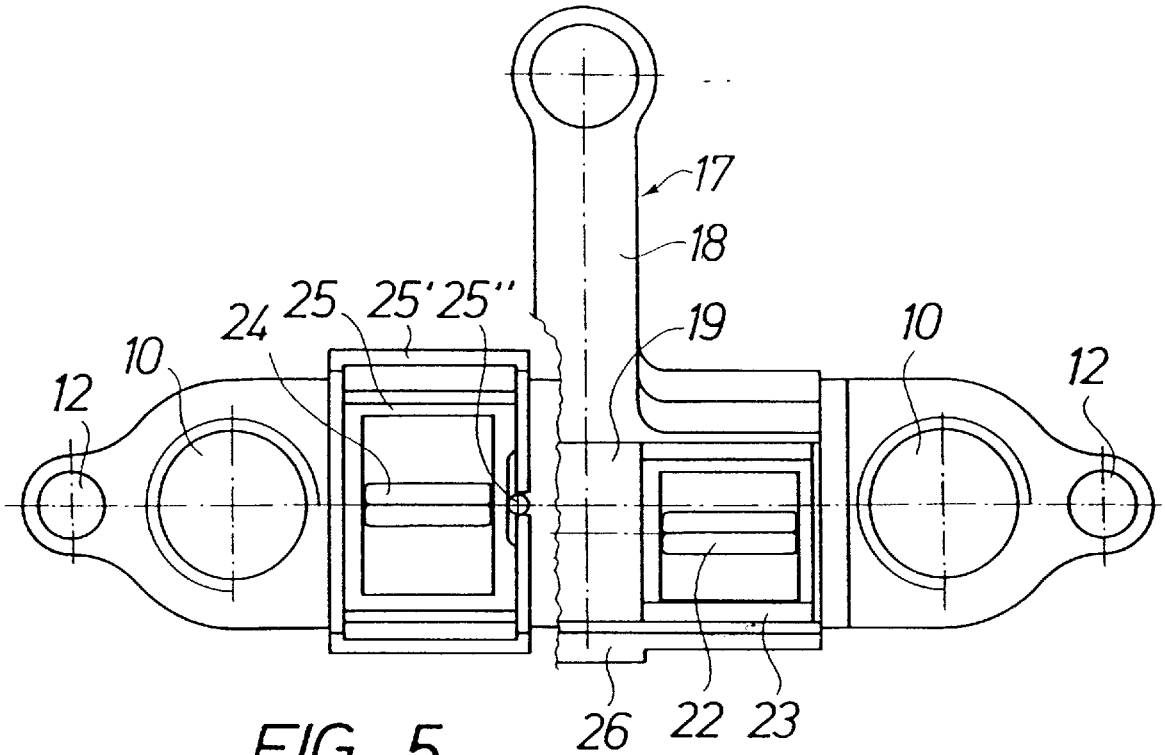
FIG. 5 is a plan view (in two levels) of a sub assembly of the caliper according to the invention, including the lever shown in FIGS. 3 and 4.
Figure 6:
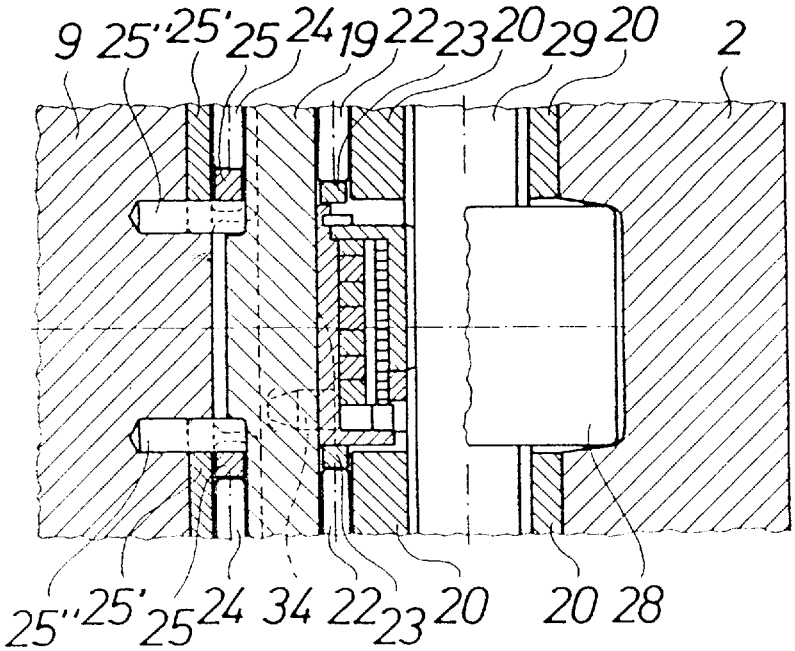
FIG. 6 is an enlargement of the central part of FIG. 2 for more clearly illustrating the adjuster part of the caliper.

Inner needle bearings 22 with inner roller cages 23 are arranged between the inner cylindrical surface 19' and the bearing tappets 20. In a similar manner outer needle bearings 24 with outer roller cages 25 are arranged between the outer cylindrical surface 19" and the cross bar 9. Each outer roller cage 25 is held in a hardened insert 25' held in place by a pin 25" in the cross bar 9 (FIGS. 5 and 6). The purpose of these needle bearings is to enable a high efficiency for the engagement between the curved wedge 19 and the curved surfaces cooperating therewith.

When the lever 17 moves from its position to the right in FIG. 1, drawn with full lines, to its position to the left in FIG. 1, drawn with dashed lines, the curved wedge 19 will be forced in between the bearing tappets 20 and the cross bar 9 and push the latter to the left in the drawing, accomplishing a brake application via the thrust sleeves 8. For axial guidance the lever 17 is provided with an outer ridge 26 between the two inserts 25'. Further, there are lower pins 27 in the inner cylindrical surface 19' and the outer cylindrical surface 19", respectively, for circumferential guidance of the roller cages 23 and 25, respectively.

The adjuster function of the disc brake caliper according to the invention will now be described. The adjuster mechanism 28 is arranged between the bearing tappets 20 and is most clearly shown in FIGS. 6 and 7. However, the general arrangement will first be described with reference to FIG. 2.

The adjuster mechanism 28 to be described is arranged on a splined shaft 29, which extends through the adjuster mechanism 28 and freely through the bearing tappets 20. Either end of the splined shaft 29 is provided with a bevel gear 30 meshing with a corresponding bevel gear 31 on a splined adjustment shaft 32 in engagement with internal splines in each thrust sleeve 8. By turning the splined shaft 29 by means of the adjuster mechanism 28 in a way to be described below, the adjustment shafts 32 will be synchronously turned for turning the thrust sleeves 8 in the cross bar 9 and moving them forward in order to compensate for wear of the brake pad 5.

Figure 7:
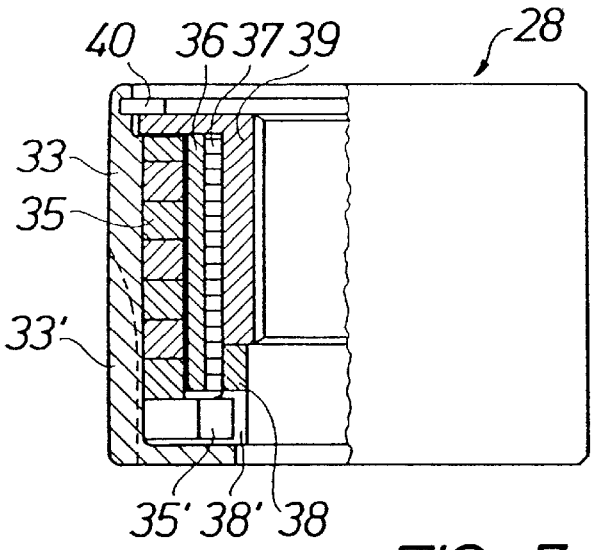
FIG. 7 is a plan view, partly in section, of an adjuster housing with its contents.

As most clearly appears from FIG. 7, the adjuster mechanism 28 has an adjuster housing 33. This adjuster housing 33 is arranged between the two bearing tappets 20 and also in a suitable recess in the cover 2, as appears from FIG. 6. The adjuster housing is provided with a key groove 33' for a pin 34 (FIG. 6) attached in the curved wedge 19 and constituting a means for transferring motions to the adjuster housing 33.

The adjuster housing 33 contains the following elements to be further described: an adjustment spring 35, a guiding sleeve 36, a one-way spring 37, a driving ring 38, an adjuster hub 39 and a locking ring 40 in the end of the adjuster housing 33 for keeping all the other parts together in the housing.

The adjustment spring of friction spring 35 has an outer diameter which is slightly larger than the inner diameter of the housing 33 and is in friction engagement therewith. At one end it is provided with a radial extension 35' engaging a corresponding recess 38' of the driving ring 38. A control distance or A-measure for the adjuster can be formed either in that the groove 33' has a greater circumferential dimension than the diameter of the pin 34 or that the recess 38' in the driving ring 38 has a greater circumferential dimension than the adjustment spring extension 35'. A radial extension of the one-way spring or locking spring 37 is attached to the driving ring 38, and two or three turns of this spring may be in firm engagement with the driving ring for providing assistance to the force transmission, whereas the remaining turns of the spring 37 may engage the adjuster hub 39 at mutual rotation in one direction, the driving direction. The purpose of the guiding sleeve 36 between the two springs 35 and 37 is to guide them and thus to assist in obtaining an accurate clutch function. The adjuster hub 39 is in splines engagement with the splined shaft 29 (FIG. 6).

During an application stroke, i e when the level 17 is moved to the left in FIG. 1 by the brake cylinder 4 and the curved wedge 19 is pushing the cross bar 9 (and associated parts) to the left in FIG. 1, the control distance or A-measure defined in either of the two places mentioned above will first be traversed. At the continued application stroke the adjustment spring 35 will be in engagement with the housing 33 by means of friction forces and will turn the thrust sleeves 8 for slack decreasing, if the slack between the brake pad and the brake disc is excessive in relation to the set control distance, until a counter-force and thus a torque is built up, when the brake pad engages the brake disc. The force transmission during adjustment occurs by means of the one-way spring 35 drivingly acting between the driving ring 38 and the adjuster hub 39. When the brake pad is in engagement with the brake disc, the torque is such that slip will occur between the housing 33 and the adjustment spring 35.

During the release stroke no torque is transmitted by the one-way spring 37 between the driving ring 38 and the adjuster hub 39. If the slack between the brake pads and the brake disc was excessive and a portion of this excessive slack has been taken up by a small rotation of the thrust sleeve 8 in relation to the cross bar 9, this new relative position will be maintained during the release stroke.

Figure 8:
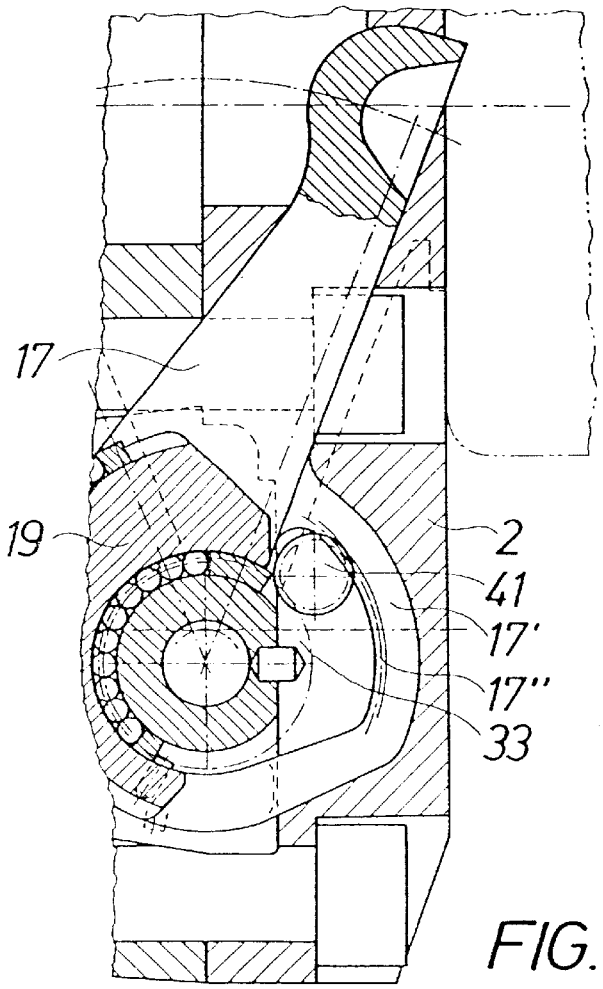
FIG. 8 is a sectional side view corresponding to FIG. 1 but to a larger scale and showing a modified embodiment.
Figure 9:
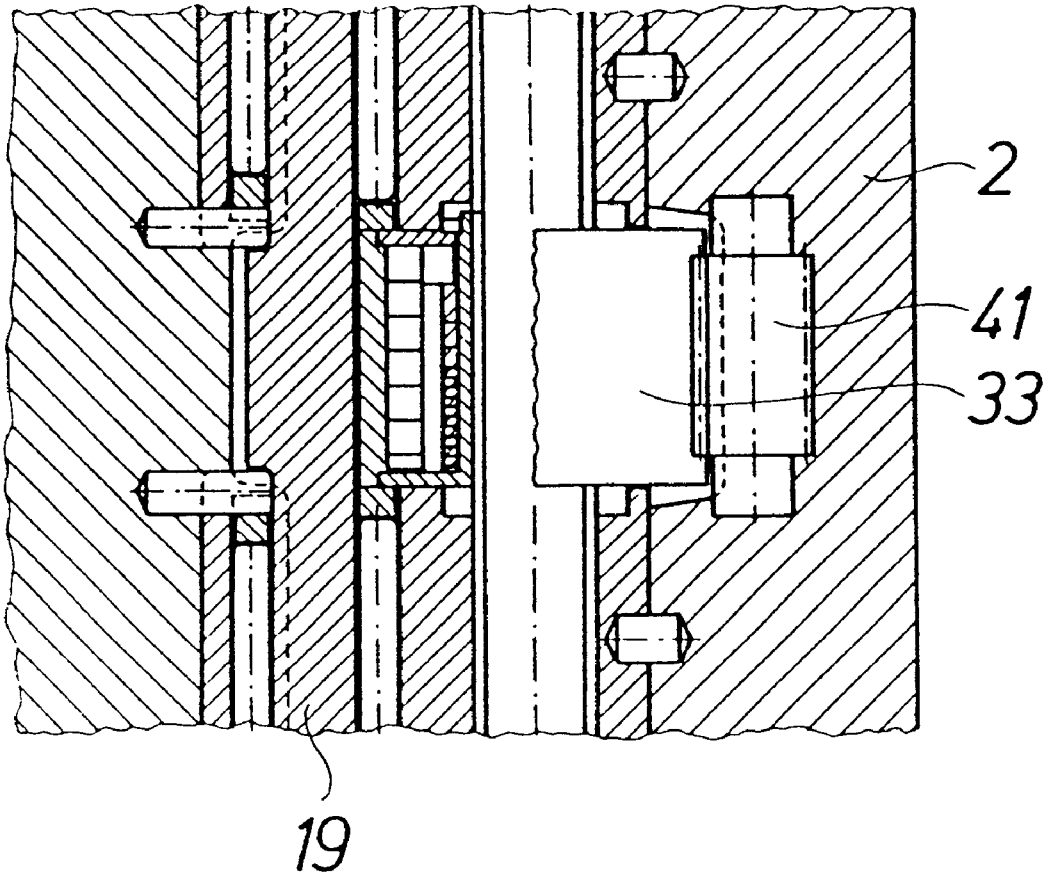
FIG. 9 is a section corresponding to FIG. 6 of the modified embodiment of FIG. 8.

A modified design for the adjuster mechanism is shown in FIGS. 8 and 9. These figures are only provided with reference numerals for parts that are referred to below and/or are different in relation to the first embodiment, shown in the previous figures.

In this embodiment according to FIGS. 8 and 9 the movement from the curved wedge 19 to the adjuster housing 33 is not performed in the same way as in the previous embodiment. Instead the lever 17 is provided with an arcuate yoke 17' having an internal, cylindrical gear segment 17" concentric with the bearing tappets 20. The housing 33 is provided with external gears, and a gear wheel 41 meshing with the gear segment 17" and with the adjuster housing 33 is rotatably journalled in the cover 2. For obtaining the desired result with this modified embodiment the contents of the adjuster housing 33 can be the same as in the first embodiment but reversed.

By this design it is possible to obtain a higher exchange ratio and thus a factor takeup of excessive slack.

I claim:

1. An interconnected disc brake caliper assembly ready for attachment to a brake cylinder (4), comprising in combination: a housing for straddling a vehicle brake disc, a cover (2) attached to the housing substantially parallel to the brake disc which further comprises two thrust sleeves (8), which are connectable to a brake pad holder (6) provided with a brake pad (5) for braking engagement with the brake disc and which sleeves are axially movable and arranged on the cover for disposal in the housing at a distance from each other, a cross bar (9) encompassing the two thrust sleeves, and a lever (17) for transmitting a brake force from a brake cylinder (4) to said crossbar, bearing tappets (20) arranged parallel with the cross bar (9) fixedly connected to the inside of the cover (2) and wherein the lever (17) comprises an arm (18) for actuation by the brake cylinder (4) and a curved wedge (19) having an inner cylindrical surface (19') in engagement with outer cylindrical surfaces of the bearing tappets and an outer cylindrical surface (19") with greater radius than the inner cylindrical surface in engagement with an inwardly directed cylindrical surface in the cross bar.

2. A disc brake caliper according to claim 1, characterized in that an adjuster mechanism (28) is arranged on a splined shaft (29) rotatably journalled in the bearing tappets (20).

3. A disc brake caliper according to claim 2 characterized in that the adjuster mechanism (28) is arranged between the two bearing tappets (20).

4. A disc brake caliper according to claim 1, characterized in that needle bearings (22, 24) are arranged between the inner cylindrical surface (19') of the curved wedge (19) and the outer cylindrical surfaces of the bearing tappets (20) and the outer cylindrical surface (19") of the curved wedge and the inner cylindrical surface in the cross bar (9).

5. A disc brake caliper according to claim 1, characterized in that the cover (2) and the cross bar (9) are resiliently connected by means of screws (13) extending through holes (12) in the cross bar and attached to the cover, a compression spring (11) being arranged between the head of each screw and a spring sleeve (14) bearing against the cross bar.

6. A disc brake caliper, comprising a housing (1) to be arranged astraddle of a vehicle brake disc, a cover (2) connected to the housing, two thrust sleeves (8) which are connected to a brake pad holder (6) provided with a brake pad (5) for braking engagement with the brake disc, said pad holder and brake pad being axially movable in the housing at a distance from each other, a cross bar (9) connecting the two thrust sleeves, and a lever (17) for transmitting a brake force to the cross bar from a brake cylinder (4) when attached to the caliper, characterized in that bearing tappets (20) arranged parallel with the cross bar (9) are fixedly connected to the inside of the cover (2) and in that the lever (17) comprises an arm (18) for actuation by the brake cylinder (4) and a curved wedge (19) having an inner cylindrical surface (19') in engagement with outer cylindrical surfaces of the bearing tappets and an outer cylindrical surface (19") with greater radius than the inner cylindrical surface in engagement with an inner cylindrical surface in the cross bar, wherein an adjuster mechanism (28) comprises an adjuster housing (33), an adjustment spring (35) with its outer periphery in engagement with an inner surface of the adjuster housing, a drying ring (38) connected to the adjustment spring by means of a radial extension (35') thereof in a driving ring recess (38'), an adjuster hub (39) connected to the splined shaft (29) by means of inner splines, and a one-way spring (37) connected to the driving ring by means of a radial extension and arranged on coaxial cylindrical surfaces of the driving ring and the adjuster hub.

7. A disc brake caliper according to claim 6, characterized in that the adjuster housing (33) is provided with external gears in engagement with a gear wheel (41) rotatably journalled in the cover (2), the gear wheel (41) in turn being in engagement with an internal gear segment (17") in an arcuate yoke (17') of the lever (17).

8. A disc brake caliper according to claim 7, characterized in that a control distance A for the adjuster is formed in that the adjuster spring extension (35') has a smaller circumferential dimension than a said driving ring recess (38').

9. A disc brake caliper according to claim 6, characterized in that the adjuster housing (33) is connected to the inner cylindrical surface (19') of the curved wedge (19) by a pin (34) extending from the surface into a housing groove (33').

10. A disc brake caliper according to claim 6, characterized in that a control distance A for the adjuster is established in that a pin (34) has a smaller diameter than a circumferential dimension of a groove (33') in said housing.

11. A disc brake caliper according to claim 6, characterized in that a control distance A for the adjuster is established by the adjuster spring extension (35') having a smaller circumferential dimension than said driving ring recess (38').

12. A disc brake caliper, comprising in combination, a housing (1) to be attached to a vehicle brake disc assembly, a cover (2) for said housing adapted to contact a brake pad holder (6) provided with a brake pad (5) for braking engagement with the brake disc, said pad holder and brake pad being axially movable in the housing during braking strokes, a cross bar (9) axially movable with said pad holder and brake pad carrying two thrust sleeves, a rotatable lever (17) for transmitting a brake force to the cross bar from a brake cylinder (4), bearing tappets (20) fixedly connected to the inside of the cover (2) having outer cylindrical surfaces for supporting the rotation of said lever (17), a curved wedge (19) carried by the lever for axially moving the cross bar in a braking operation, said lever (17) further having an inner cylindrical surface (19') in engagement with outer cylindrical surfaces of the bearing tappets and an outer cylindrical surface (19") with greater radius than the inner cylindrical surface in engagement with a mating cylindrical surface of the cross bar, and needle bearings affixed adjacent to the respective inner and outer cylindrical surfaces of the lever (17) to reduce friction between the inner and outer cylindrical surfaces of the lever (17) and the respective tappets (20) and the cylindrical surface of the cross bar.

*13. A disc brake caliper system comprising a housing (1) to be arranged astraddle of a vehicle brake disc, a cover (2) attached to the housing, two thrust sleeves (8), which are connected to a brake pad holder (6) provided with a brake pad (5) for braking engagement with the brake disc and which are axially movable in the housing at a distance from each other, a cross bar (9) connecting the two thrust sleeves, and a lever (17) for transmitting a brake force from a brake cylinder (4) attached to the housing, to the cross bar, characterized in that the mechanism including the cover (2), the thrust sleeves (8), the cross bar (9) and the lever (17) is a self-sustained unit for insertion in the housing (1), and further characterized in that the cover (2) and the cross bar (9) are resiliently connected by means of screws (13) extending through holes (12) in the cross bar and attached to the cover, a compression spring (11) being arranged between the head of each screw and a spring sleeve (14) bearing against the cross bar.*

*14. A disc brake caliper system comprising a housing (1) to be arranged astraddle of a vehicle brake disc, a cover (2) attached to the housing, two thrust sleeves (8), which are connected to a brake pad holder (6) provided with a brake pad (5) for braking engagement with the brake disc and which are axially movable in the housing at a distance from each other, a cross bar (9) connecting the two thrust sleeves, and a lever (17) for transmitting a brake force from a brake cylinder (4) attached to the housing, to the cross bar, characterized in that the mechanism including the thrust sleeves (8), the cross bar (9) and the lever (17) is a self-sustained unit for insertion in the housing (1) and further characterized in that bearing tappets (20), parallel with the cross bar (9), are fixedly connected to the inside of the cover (2) and in that the lever (17), besides an arm (18) for actuation by the brake cylinder (4), comprises a curved wedge (19), having an inner cylindrical surface (19') in engagement with outer cylindrical surfaces of the bearing tappets and an outer cylindrical surface (19")—with greater radius than the inner cylindrical surface—in engagement with an inner cylindrical surface of the cross bar.*

*15. A mechanism according to claim 14 characterized in that an adjuster mechanism (28) is arranged on a splined shaft (29) rotatably journalled in the bearing tappets (20).*

*16. A mechanism according to claim 15, characterized in that the adjuster mechanism (28) is arranged between the two bearing tappets (20).*

*17. A mechanism according to claim 16, characterized in that an adjuster housing (33) of the adjuster mechanism (28) is provided with external gears in engagement with a gear wheel (41) rotatably journalled in the cover (2), the gear wheel (41)* in turn being in engagement with an internal gear segment(*17"*) *in an arcuate yoke (17') of the lever (17).*

*18. A brake application mechanism, comprising in combination:*

*a first modular housing unit for receiving a brake application mechanism adapted to be disposed between a brake cylinder and a braking pad,*

*a second modular cover unit for insertion into said housing unit comprising an independent self sustained brake application mechanism with a brake force transmitting lever for transmitting brake forces from the brake cylinder to the braking pad, and*

*attachment means comprising spring biased screws arranged between the housing unit and the cover unit for attaching the brake application mechanism of the cover and having the brake application mechanism held together with the cover as a unit for insertion into said housing unit.*

* * * * *

UNITED STATES PATENT AND TRADEMARK OFFICE

CERTIFICATE OF CORRECTION

PATENT NO. : Re 37,231 P2
DATED : June 19, 2001
INVENTOR(S) : Lars Serverinsson

It is certified that error appears in the above-identified patent and that said Letters Patent is hereby corrected as shown below:

Column 7,
Line 7, please insert:

*RELATED APPLICATIONS*

*A continuation of the present reissue patent was filed on October 11, 2000 and assigned U.S. Patent Application No. 09/710,962.*

Signed and Sealed this

Twenty-sixth Day of February, 2002

*Attest:*

*Attesting Officer*

JAMES E. ROGAN
*Director of the United States Patent and Trademark Office*